(12) United States Patent
Cortenraad et al.

(10) Patent No.: US 7,652,236 B2
(45) Date of Patent: Jan. 26, 2010

(54) LIGHTING SYSTEM FOR COLOR CONTROL

(75) Inventors: Hubertus Maria Rene Cortenraad, Maastricht (NL); Anthonie Hendrik Bergman, Eindhoven (NL); Peter Hubertus Franciscus Deurenberg, Eindhoven (NL); Jelm Franse, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 11/912,341

(22) PCT Filed: Apr. 19, 2006

(86) PCT No.: PCT/IB2006/051205

§ 371 (c)(1),
(2), (4) Date: Oct. 23, 2007

(87) PCT Pub. No.: WO2006/114725

PCT Pub. Date: Nov. 2, 2006

(65) Prior Publication Data

US 2008/0185499 A1    Aug. 7, 2008

(30) Foreign Application Priority Data

Apr. 28, 2005   (EP)   ................... 05103534
Jun. 23, 2005   (EP)   ................... 05105627

(51) Int. Cl.
*G01J 1/32*   (2006.01)

(52) U.S. Cl. ...................................... 250/205; 250/226
(58) Field of Classification Search ............... 250/205, 250/226; 356/402, 405, 406, 407; 362/227, 362/231, 276, 230
See application file for complete search history.

(56) References Cited

U.S. PATENT DOCUMENTS 4,871,258 A * 10/1989 Herpichboehm et al. .... 356/422

(Continued)

FOREIGN PATENT DOCUMENTS

DE       10106284 A1      8/2002

(Continued)

OTHER PUBLICATIONS

English translation for JP09-148086.*

*Primary Examiner*—Thanh X Luu
*Assistant Examiner*—Francis M Legasse, Jr.

(57) ABSTRACT

A lighting arrangement provides light of a desired color. The arrangement includes light sources that each emit light of a respective color that, when mixed, is perceivable as the desired color. A light detector is configured to receive light reflected by a color reference surface having a specific reference color. A controller is configured to analyzes a signal from the light detector and recognizes the color of the received light as the color of the reference surface. The controller controls the light sources such that the desired color corresponds to the color of the color reference surface.

25 Claims, 2 Drawing Sheets

U.S. PATENT DOCUMENTS

| | | |
|---|---|---|
| 5,004,349 A | 4/1991 | Sato et al. |
| 5,694,227 A | 12/1997 | Starkweather |
| 6,381,037 B1 | 4/2002 | Balasubramanian et al. |
| 6,459,076 B1 * | 10/2002 | Schlenker .................. 250/205 |
| 6,798,517 B2 | 9/2004 | Wagner et al. |
| 7,199,344 B2 * | 4/2007 | Blake ......................... 250/205 |
| 2004/0036006 A1 * | 2/2004 | Dowling .................... 250/205 |
| 2005/0030538 A1 | 2/2005 | Jaffer et al. |
| 2005/0156103 A1 * | 7/2005 | May et al. .................. 250/228 |

FOREIGN PATENT DOCUMENTS

| | | |
|---|---|---|
| JP | 03252091 A1 | 11/1991 |
| JP | 09148086 A1 | 6/1997 |
| JP | 10125479 A1 | 5/1998 |
| WO | 0136864 A2 | 5/2001 |
| WO | 0199474 A1 | 12/2001 |
| WO | 2004079314 A1 | 9/2004 |

* cited by examiner

LIGHTING SYSTEM FOR COLOR CONTROL

The present invention relates to a lighting arrangement and a lighting system configured to provide light of a desired color and a method of providing light of a desired color as well as a device for controlling a lighting arrangement.

Light sources that are capable of producing a very large part of the spectrum of colored light will become more and more in demand, both from private households and from commercial entities such as retail shops. The desire, from a private household perspective, is expected to be that essentially any color or atmosphere can be created in the living room, bedroom etc. From the perspective of a commercial enterprise, the desire is to provide attractive colored displaying options for products.

However, what is lacking in the technical field of lighting systems at the moment are easy and intuitive ways to control the colors of the light sources. The ease of use is very important because changing the light color is new to many people, since up to now in most cases the choice was on or off.

There do exist lighting systems that include remote controls having plus/minus red, green and blue buttons for controlling the emitted color. However, this is typically a very awkward way to control the color if the user is not educated in the theory of mixing colors. More sophisticated remote control exists that includes control buttons for hue, saturation, brightness etc., all suffering from being complicated to use.

One example of a system in the field of the present invention is the international patent application published with number WO 01/99474 and disclosing a lighting control device. The device comprises a sensor capable of measuring visible light in a room, e.g. the color of the sunlight entering the room, and controlling the lighting in the room in dependence on the measured light. The lighting system of WO 01/99474 analyses two-dimensional images of a room, taking into account movement, shadows and other features in order to enable accurate control of the lighting environment in the room. The system disclosed in WO 01/99474 is, however, not capable of controlling the color of the emitted light to be any desired color.

It is an object of the present invention to overcome this problem, and to provide a way of controlling the light of a lighting system to be any desired color.

The object is achieved in different aspects as a lighting arrangement, a lighting system, a method of providing light and a control device according to the appended claims.

Hence, in a first aspect, the invention provides a lighting arrangement configured to provide light of a desired color. The arrangement comprises a plurality of light sources that each are configured to emit light of a respective color that, when mixed, is perceivable as the desired color. The lighting arrangement further comprises a light detector configured to receive light reflected by a color reference surface having a specific reference color. The detector is also configured to provide a signal indicative of said received light. A controller comprised in the lighting arrangement is configured to analyze the signal from the light detector and is thereby capable of recognizing the color of the received light as the color of the reference surface. The controller is further configured to control the light sources such that the desired color corresponds to the color of the color reference surface.

In one preferred embodiment, the lighting arrangement further comprises a source of white light configured to illuminate the color reference surface, and the light detector comprises a color sensor, for example in the form of photodiodes with different color filters or a CCD device, configured to detect the white light after being reflected from the color reference surface.

In another embodiment, the light detector in the lighting arrangement comprises a single photo detector and the controller is configured to sequentially control the light sources to emit light for a respective duration. That is, a color sequential scan is performed. For example, during a sequential scan using three light sources of the known RGB system, the light sources are controlled to first emit only light of a first color, then only light of a second color, and finally only light of a third color. Alternatively, the light sources are controlled to emit light of further colors. The color of the color reference surface is hence determined using one single photo detector, which is advantageous not least in terms of simplicity and low cost.

The light detector may also be configured to also detect direct light from the light sources and the controller configured to control the light sources based also on the detected direct light. That is, feedback features that advantageously provide a way of correcting color deviations due to, e.g., temperature variations of the light sources.

In any of these embodiments, the controller may be configured to continuously analyze the detected light and to continuously control the light sources. Alternatively, the controller may be configured to analyze the detected light and to control the light sources as a response to a triggering signal.

Moreover, the lighting arrangement may also comprise memory means for storing information regarding the control of the light sources such that a plurality of desired colors are stored and where the stored colors are selectable.

In one embodiment, the lighting arrangement also comprises a diffuser to diffuse the light from the light sources. Alternatively, a diffuser is not required when the lighting arrangement is for providing indirect lighting by projection of the light onto a surface such as a ceiling or a wall. In such an embodiment, the different colors are mixed on the surface of the wall or ceiling and a diffuser is not required. Moreover, the light sources may conform to the RGB system and preferably be in the form of light emitting diodes (LED), but may also be in the form of color fluorescence lamps (CFL).

In a second aspect, the invention provides a lighting system configured to provide light of a desired color. The system comprises a plurality of lighting arrangement as described above and each lighting arrangement further comprises communication means for communicating a signal that enables the controller in each arrangement to control the light sources such that the desired color corresponds to the color of the color reference surface.

In a third aspect, the invention provides a method for providing light of a desired color. The method comprises controlling a plurality of light sources to emit light of a respective color that, when mixed, is perceivable as the desired color. Light reflected by a color reference surface having a specific reference color is received and thereby provides a signal indicative of the received light. The signal is analyzed and thereby the color of the received light is recognized as the color of the reference surface. Finally, the light sources are controlled such that the desired color corresponds to the color of the color reference surface.

In a fourth aspect, the invention provides a color control device for controlling a lighting arrangement to provide light of a desired color. The lighting arrangement preferably comprises a plurality of light sources, each light source configured to emit light of a respective color that, when mixed, is perceivable as the desired color. That is, the lighting arrangement is similar to the arrangements discussed above. The color control device is characterized by a light detector configured to receive light reflected by a color reference surface having a specific reference color, and configured to provide a signal indicative of said received light. Moreover, the control device comprises a controller configured to analyze the signal from the light detector and thereby being capable of recognizing the color of the received light as the color of the reference surface, and configured to control the light sources in the lighting arrangement such that the desired color corresponds to the color of the color reference surface.

An advantage of the invention is that it provides an easy and intuitive way of controlling a lighting arrangement to provide light of any desired color. This is achieved in the most simple manner by way of analyzing reflected light from a color reference surface having the desired color and controlling the individual light sources to emit a respective intensity of colored light that when mixed via, e.g., a diffuser provides light of the desired color. The color reference surface may be a surface on any suitable entity, including such a simple entity as a piece of colored paper.

The advantages may be perceived from the point of view of a private person using the invention in a home environment, where the invention adds to the comfort experienced by the user.

From the point of view of a commercial enterprise, the invention is of special interest because choosing the right lighting setting for displaying products in the shop is an important issue. For example, instead of having to apply paint in different colors in a display environment for a product, varying color settings of the display environment may be obtained by the use of the invention.

This and other aspects of the present invention will now be described in more detail, with reference to the appended drawings showing a currently preferred embodiment of the invention.

Figure 1:
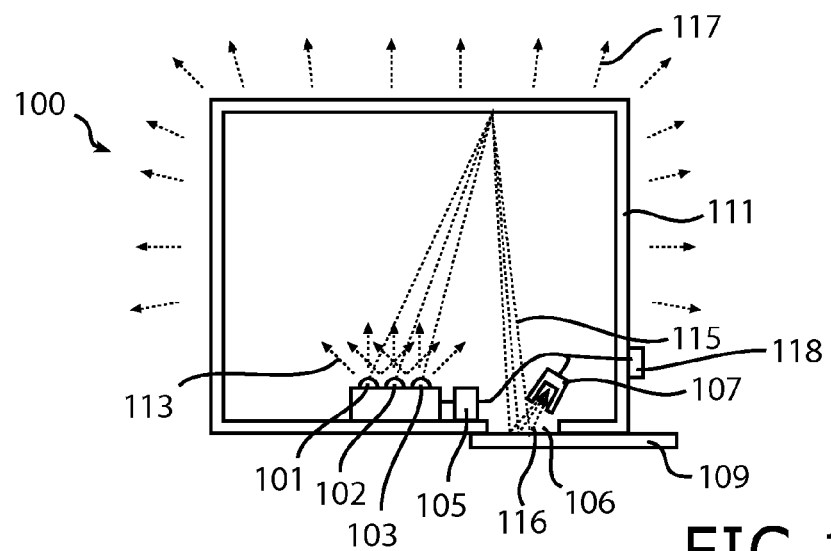
FIG. 1 shows schematically a cross sectional view of a first embodiment of an arrangement according to the present invention.

A LED based lighting arrangement 100 with incorporated color sequential scanning will be described with reference to FIG. 1. The scanning function is used to scan a color reference surface in the form of a color "card" that indicates the desired color setting of the lighting arrangement 100.

The lighting arrangement 100 comprises three LED light sources conforming to the RGB color system, that is a red (R) LED 101, a green (G) LED 102 and a blue (B) LED 103. Although a three LED configuration conforming to the RGB system is used here, other configurations are possible that involve other numbers of LEDs and other color systems.

The emission of light 113 by the LEDs 101-103 is controlled by a controller 105 connected to the LEDs and a power source (not shown for simplicity). A light detector 107 in the form of a simple photo diode is also connected to the controller 105. A diffuser 111 encloses the light sources 101-103, the controller 105 and the light detector 107, except for an opening 106 through which reflected light 115 from the light sources 101-103 falls upon a color reference surface in the form of a "color card" 109, which in a simple form is a piece of colored paper. Although FIG. 1 shows light hitting the card 109 indirectly, other configurations are possible where light also hits the card 109 directly. This depends on the position of the opening 106.

No detailed description of circuitry in the controller 105, the LEDs 101-103 or the light detector 107 will be made here, as this would unnecessarily obscure the description of the invention with features already known to the person skilled in the art. Nevertheless, the controller 105 preferably includes programmable means and memory means as well as any necessary interfacing circuitry for connecting with the LEDs 101-103 and the light detector 107.

Scanning of the color card 109 is performed in that the detector 107 receives light 116 reflected by the color card 109 and the controller 105 analyzes a signal, generated by the detector 107, which is indicative of the received light. That is, light 115 from the LEDs 101-103 is scattered through the aperture 106 of the diffuser 111 via the color card 109 onto the light detector 107. Preferably, no light reaches the light detector 107 directly from the LEDs 101-103. By performing a color sequential scan, in the sense that the controller 105 controls the LEDs 101-103 to first emit only red light, then only green light, and finally only blue light, the color of the color card 109 can be determined using a single photo-diode as light detector 107. Further accuracy of the color determination may be obtained by scanning with all LEDs off. This may correct for any ambient lighting from other light sources (not shown).

The fact that the LEDs 101-103 have a very small response time (<<1 ms) can be exploited in this application because the color sequential scanning can be performed so fast that a viewer will not notice any flashing of the different LED colors.

The scanning of the color card 109 can be either continuous, for example at a frequency of the order of 1 Hz, or only when the user triggers a scan by, e.g., pressing switching means 118 such as a button or touch sensitive pad or the like connected to the controller 105.

The intensity setting of the LEDs 101-103 during the scanning procedure may be any one of several options. However, preferably, the scanning intensity corresponds to the already set intensity of the light, i.e. the light 117 perceived by a viewer, so that the average intensity is not changed during the scanning process.

Preferably, the integrated intensity of the color over time is constant. Due to the fact that during the scanning of one color, the other colors have zero intensity, the intensity of the color during the scan can be higher so that the average intensity over time is constant. For example, it is assumed that before the scan the intensity of the red LED 101 equals a specific intensity C. Each color is scanned during time T. During the scan of the G LED 102 and the B LED 103, the intensity of the red LED 101 is zero. Thus, during the scanning of the red LED 101, the intensity of red can be 3C so that the average over time is again the constant intensity C. Other options are, for example, the highest or lowest LED light intensity levels.

In an application where it is not desirable to have a colored card 109 more or less attached to the lighting arrangement 100 all the time, the controller 105 may store, in memory means (not shown), the color information and continuously "show" that color when the lighting arrangement 100 is active, until a card with a different color is detected. For example, the controller 105 may store the previous five scanned colors as user presets. When the users provides a triggering signal by, e.g. touching a touch sensitive control switch or a simple button switch, the lighting arrangement 100 may cycle through these colors, and the users may select a certain stored preset color by releasing the button when the desired color is shown.

An alternative to using LEDs is to use other forms of light sources. When using LEDs, the scanning can be performed unnoticeably. However, the principle of color sequential scanning a color card can also be used with "slower" lighting arrangements like color fluorescence lamps (CFL), but in this case sequential color flashing would be observable due to the larger response time of CFLs as compared to the response times of LEDs.

Figure 2:
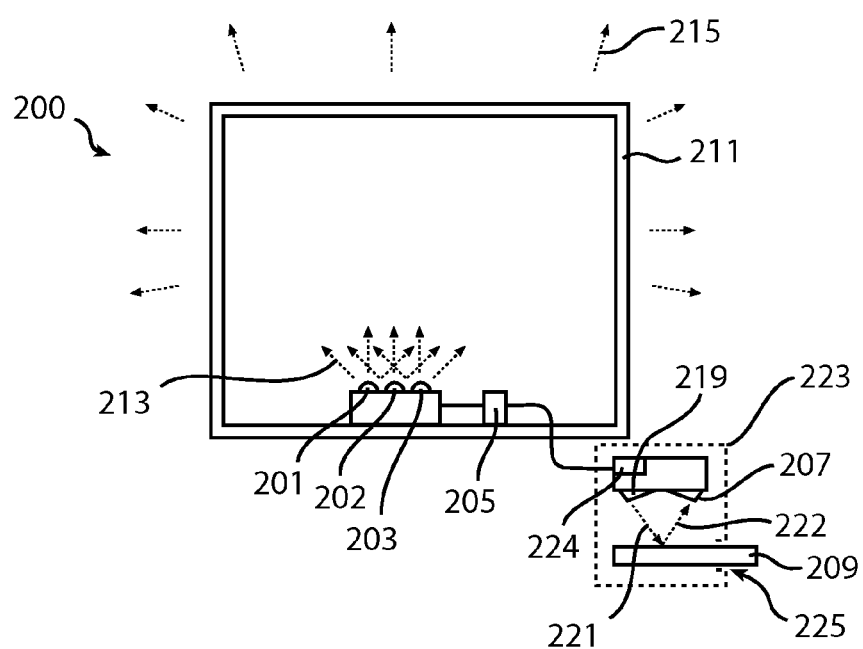
FIG. 2 shows schematically a cross sectional view of a second embodiment of an arrangement according to the present invention.

Turning now to FIG. 2, a second embodiment of a lighting arrangement will be discussed. Similar to the arrangement 100 described above in connection with FIG. 1, a lighting arrangement 200 comprises three LED light sources 201, 202 and 203. It is to be noted that in this embodiments no color sequential scanning is performed, so the response time of the light sources is less important. Therefore, in this embodiment light sources of other types than LEDs may be utilized.

The emission of light 213 by the LEDs 201-203 is controlled by a controller 205 connected to the LEDs and a power source (not shown for simplicity). A light detector 207 in the form of a color sensor is also connected to the controller 205. A diffuser 211 encloses the light sources 201-203 and the controller 205.

In contrast to the embodiment of FIG. 1, white light 221 emanating from a white light source 219 falls upon a color reference surface in the form of a "color card" 209, which in a simple form is a piece of colored paper. The white light source 219 is preferably realized by means of any white light source, including a white LED, known in the art.

No detailed description of circuitry in the controller 205, the LEDs 201-203 or the light detector 207 will be made here, as this would unnecessarily obscure the description of the invention with features already known to the person skilled in the art. Nevertheless, a color sensor, which in its simplest form may be three photo-diodes arranged with different color filters, e.g. RGB, (not shown), is typically used. However, a CCD chip such as typically incorporated in image sensors used in digital cameras, web cameras and now also in mobile phones, may also be used.

The detector 207 receives light 222 from the white light source 219 reflected by the color card 209. The controller 205 then analyzes a signal generated by the detector 207, which is indicative of the color of the received light 222 and controls the LEDs 201-203 to emit light 213 that after being diffused by the diffuser 211 is perceivable as the desired light 215.

The detector 207 and the white light source 219 are preferably assembled together in a small box 223 having a slit 225 into which the color card 209 is inserted when a user desires to change the color of the lighting arrangement 200. The box 223 may also be configured such that the slit 225 is in the form of an "eye" such that when it is placed on top of a colored surface, the surface is color scanned as discussed above. A variation of such a "color control box" 223 may be to incorporate the white light source 219 and the color sensor 207 into a pen-like device to be used as a pointing device by a user to point at a colored surface having the desired color. The "color control box" 223, preferably comprising a controller 224, is connected to the controller 205 and communicate with the controller 205 by means of a wired (as indicated in FIG. 2) or wireless connection. The controller 224 may alternatively be integrated with the controller 205.

Figure 3:
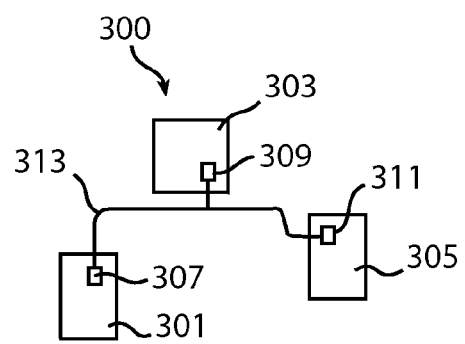
FIG. 3 shows schematically a system according to the present invention.
Figure 4A:
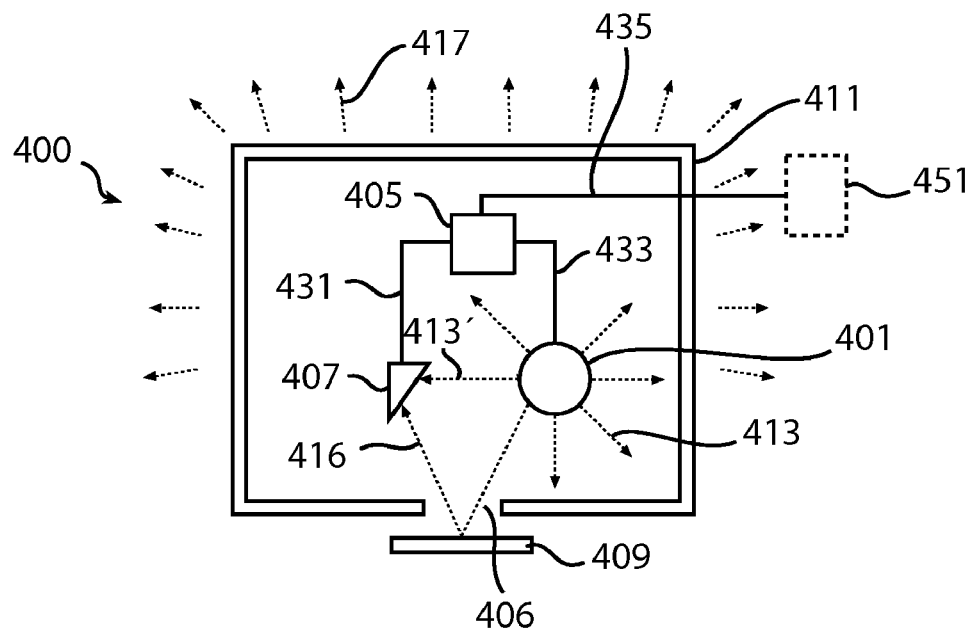
FIGS. 4a and 4b show schematically an embodiment of the present invention involving a color feedback system.
Figure 4B:
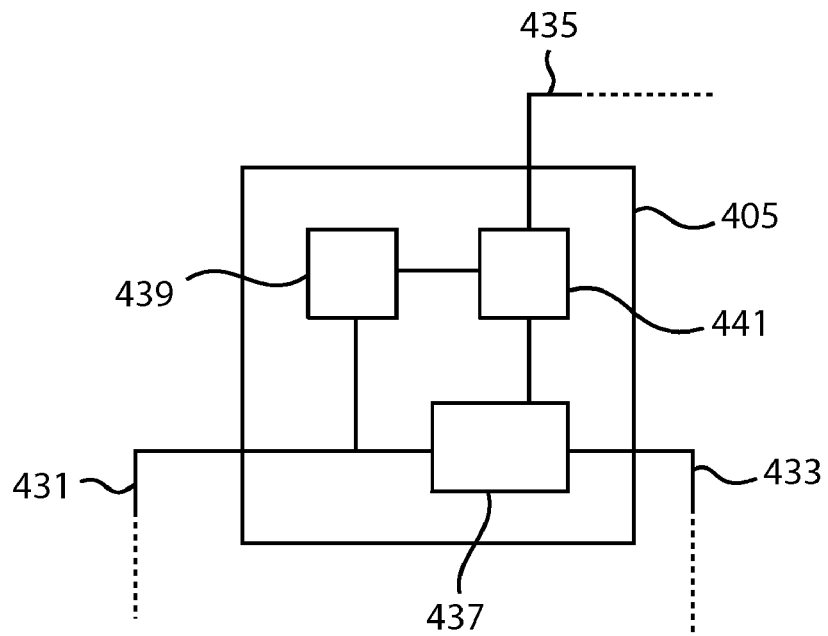

Before describing a system in FIG. 3, attention will now be turned to FIGS. 4a and 4b. FIGS. 4a and 4b illustrate an embodiment of a lighting arrangement incorporating a feedback system. Similar to the arrangements 100, 200 described above in connection with FIGS. 1 and 2, a lighting arrangement 400 comprises a light source 401, preferably comprising three LEDs as in the previous embodiments. It is to be noted that in this embodiment no color sequential scanning is performed.

The emission of light 413 by the light source 401 is controlled by a controller 405 connected to the light source 401 and a power source (not shown for simplicity). A light detector 407 in the form of a color sensor is also connected to the controller 405 and is configured to receive light 413' directly from the light source 401 as well as receiving light 416 reflected by a color reference surface 409 through a hole 406 in a diffuser 411, similar to the embodiment of FIG. 1. The controller is configured to receive externally generated control signals from an external system 451. Such signals may, as the skilled person will realize, conform to any relevant standard such as DALI, DMX, RF etc. and may involve setting of color and dim level as well as signals ordering the lighting device to "copy" the color of the color reference surface 409. The controller 405 may also be configured to detect, via the detector 407, a triggering signal in the form of, e.g., a large change in ambient light due to the reference surface 409 being held very close to the lighting device, the triggering being indicative of a user's desire to change the color of the light 417 emitted by the device 400.

FIG. 4b illustrates the controller 405 in some more detail. The controller 405 comprises three functional units that are implemented, as the skilled person will realize, by means of both hardware circuitry as well as software.

An interface unit 441 receives signals from the external system 451 via a connection 435 and delivers reference power settings to each individual light-emitting unit (e.g. LED) in the light source 401 via a connection 433. The interface unit 441 receives signals also from a converting unit 439 that converts signals output via a connection 431 from the color sensor 407 into signals that conform to a color coordinate system such as (x,y) and (u,v).

A color correction function 437, i.e. an algorithm realized by software instructions, receives the output from the interface unit 441 as well as signals output by the color sensor 407. The color correction function 437 provides color corrected power levels to the light source 401, as will be described further below. Light 413 emanating from the light source 401 exits from the lighting device 400 as indicated by reference numeral 417. Some light, as indicated by reference numeral 413', falls upon the color sensor 407. The color correction function/algorithm 437 continuously adapts the driving signals for the light source 401 based on the signal from the color sensor 407. By this, the output of the light source 401 remains constant in color (and flux) irrespective of temperature variations of the light source 401 as well as over very long periods of time. This is advantageous when the lighting device 400 is used, e.g., in a color copying apparatus.

The color of the light source 401 can be changed either by simply providing, from the external system 451, new target color coordinate signals via the interface unit 435 to the light source 401 or by copying the color of the color reference surface 409. In the latter case, the light source 401 is placed in an operating mode where it emits white light with sufficient color rendering properties. In addition, the color correction function 437 is temporary put on hold using the most recent data from the color sensor 407. The color sensor 407 receives the reflected light 416 from the color reference surface 409. The output of the sensor 407 is then translated, in converting unit 439, to new target color coordinates for the light source 401, which are provided via the interface unit 441 to the light source 401. This results in that the light 413 emanating from the light source 401 changes to the color of the color reference surface 409.

FIG. 3 illustrates very schematically a lighting system 300 comprising a plurality of interconnected lighting arrangements 301, 303, 305 that preferably are in the form of lighting arrangements such as the arrangements 100, 200, 400 described above in connection with FIGS. 1, 2 and 4*a-b*. A first light emitting arrangement 301 comprising a controller 307, a second light emitting arrangement 303 comprising a controller 309 and a third light emitting arrangement 305 comprising a controller 311 are connected by means of a signal connection 313. The controllers 307, 309, 311 comprise respective communication means and the signal connection 313 may be any known connection means, including wire connections as well as wireless connections. Communication between the controllers 307, 309 and 311 may be performed using any appropriate signaling protocol known to the skilled person.

When any one of the light emitting arrangements 301, 303 or 305 obtains color information from a certain color card, it can use this information just for that particular lighting arrangement, or the color can also be communicated to the other lighting arrangements so that all arrangements 301, 302, 303 emit the same light.

The person skilled in the art realizes that the present invention by no means is limited to the preferred embodiments described above. On the contrary, many modifications and variations are possible within the scope of the appended claims.

The invention claimed is:

1. A lighting arrangement configured to provide light of a desired color comprising:
    a plurality of light sources, each light source configured to emit light of a respective color that, when mixed, is perceivable as the desired color,
    a light detector configured to receive light reflected by a color reference surface having a specific reference color, and configured to provide a signal indicative of said received light, wherein the signal is provided in response to inserting the color reference surface into a slit, and
    a controller configured to analyze the signal from the light detector and thereby being capable of recognizing the color of the received light as the color of the reference surface, and configured to control the light sources in response to the signal provided by inserting the color reference surface into a slit such that the desired color of the light provided by the lighting arrangement corresponds to the color of the color reference surface.

2. The lighting arrangement according to claim 1, further comprising a source of white light configured to illuminate the color reference surface, and where the light detector comprises a color sensor configured to detect the white light after being reflected from the color reference surface.

3. The lighting arrangement according to claim 1, where the light detector comprises a single photo detector and where the controller is configured to sequentially control the light sources to emit light for a respective duration.

4. The lighting arrangement according to claim 1, wherein the light detector is configured to also detect direct light from the light sources and where the controller is configured to control the light sources based also on the detected direct light.

5. The lighting arrangement according to claim 1, further comprising memory means for storing information regarding the control of the light sources such that a plurality of desired colors are stored and where the stored colors are selectable.

6. The lighting arrangement according to claim 1, further comprising a diffuser.

7. The lighting arrangement according to claim 1, where the light sources conform to the RGB system.

8. The lighting arrangement according to claim 1, where the light sources are light emitting diodes.

9. The lighting arrangement according to claim 1, where the light sources are color fluorescence lamps.

10. A lighting system configured to provide light of a desired color comprising a plurality of lighting arrangements according to claim 1 and wherein each lighting arrangement further comprises communication means for communicating a signal that enables the controller in each arrangement to control the light sources such that the desired color corresponds to the color of the color reference surface.

11. The lighting arrangement of claim 1, wherein the controller is configured to control the light sources in response to detection of a change in ambient light due to the color reference surface being held close to the light detector.

12. The lighting system according to claim 2, where the color sensor comprises a plurality of photo diodes arranged with color filters.

13. The lighting arrangement according to claim 2, where the color sensor is a CCD device.

14. The lighting arrangement according to 2, where the controller is configured to continuously analyze the detected light and to continuously control the light sources.

15. The lighting arrangement according to claim 2, where the controller is configured to analyze the detected light and to control the light sources as a response to a triggering signal.

16. A method for providing light of a desired color comprising the acts of:
    controlling a plurality of light sources to emit light of a respective color that, when mixed, is perceivable as the desired color,
    receiving light reflected by a color reference surface having a specific reference color,
    providing a signal indicative of said received light in response to pointing a pointing device to the color reference surface,
    analyzing the signal and thereby recognizing the color of the received light as the color of the reference surface, and
    controlling the light sources such that the desired color corresponds to the color of the color reference surface as determined by the analyzing act from the signal obtained by pointing the pointing device to the color reference surface.

17. The method according to claim 16, wherein the control of the light sources is performed such that the light sources sequentially emit light for a respective duration.

18. The method according to claim 16, wherein the analysis and the control is performed continuously.

19. The method according to claim 16, wherein the analysis and the control is performed as a response to a triggering signal.

20. The method according to 16, further comprising storing information regarding the control of the light sources such that a plurality of desired colors are stored and where the stored colors are selectable.

21. The method according to claim 16, wherein light is also detected directly from the light sources and where the light sources are controlled based also on the detected direct light.

22. The method of claim 16, wherein the providing act is performed in response to detection of a change in ambient light due to the color reference surface being held close to a detector that receives the light reflected by the color reference surface.

23. A color control device for controlling a lighting arrangement to provide light of a desired color, said lighting arrangement comprising a plurality of light sources, each light source configured to emit light of a respective color that, when mixed, is perceivable as the desired color, said color control device being characterized by:
   a light detector configured to receive light reflected by a color reference surface having a specific reference color, and configured to provide a signal indicative of said received light, and
   a controller configured to analyze the signal from the light detector and thereby being capable of recognizing the color of the received light as the color of the reference surface, and configured to control the light sources in the lighting arrangement in response to inserting the color reference surface into a slit such that the desired color corresponds to the color of the color reference surface for providing the light of the desired color corresponding to the color of the color reference surface.

24. The color control device of claim 23, wherein the controller is configured to control the light sources in response to detection of a change in ambient light due to the color reference surface being held close to the light detector.

25. The color control device of claim 23, wherein the light detector is included in a pointing device, and the signal is provided in response to pointing the light detector to the color reference surface.

* * * * *